US011598706B2

(12) United States Patent
Wilson et al.

(10) Patent No.: US 11,598,706 B2
(45) Date of Patent: Mar. 7, 2023

(54) DEVICES AND METHODS FOR DETERMINING THE DENSITY OF INSULATION

(71) Applicant: CertainTeed LLC, Malvern, PA (US)

(72) Inventors: Jonathan Wilson, Northboro, MA (US); Timothy Briggs, Clinton, MA (US)

(73) Assignee: CertainTeed LLC, Malvern, PA (US)

( * ) Notice: Subject to any disclaimer, the term of this patent is extended or adjusted under 35 U.S.C. 154(b) by 0 days.

(21) Appl. No.: 17/253,874

(22) PCT Filed: Jun. 21, 2019

(86) PCT No.: PCT/US2019/038521
§ 371 (c)(1),
(2) Date: Dec. 18, 2020

(87) PCT Pub. No.: WO2019/246548
PCT Pub. Date: Dec. 26, 2019

(65) Prior Publication Data
US 2021/0372903 A1   Dec. 2, 2021

Related U.S. Application Data

(60) Provisional application No. 62/688,242, filed on Jun. 21, 2018.

(51) Int. Cl.
*G01N 9/00* (2006.01)
(52) U.S. Cl.
CPC ..................................... *G01N 9/00* (2013.01)
(58) Field of Classification Search
None
See application file for complete search history.

(56) References Cited

U.S. PATENT DOCUMENTS

2005/0102971 A1   5/2005   O'Leary et al.
2005/0160820 A1   7/2005   Tinianov
(Continued)

FOREIGN PATENT DOCUMENTS

WO        2016204735 A1    12/2016
WO     WO-2016204735 A1 *  12/2016   ............. G01N 29/11

OTHER PUBLICATIONS

PCT International Search Report and Written Opinion, Application No. PCT/US2019/038521, dated Oct. 28, 2019, 10 pages.

*Primary Examiner* — Raul J Rios Russo
*Assistant Examiner* — Carl F. R. Tchatchouang
(74) *Attorney, Agent, or Firm* — McDonnell Boehnen Hulbert & Berghoff LLP

(57) ABSTRACT

The present disclosure relates to devices and methods for determining the density of insulation. For example, one aspect of the disclosure is a device that includes a first unit that includes a sound generator and a second unit that includes a sound sensor and a probe. The probe is configured to be inserted into insulation such that the sound sensor is outside of the insulation and is configured to detect sound that is generated by the sound generator outside of the insulation and transmitted through the insulation and the probe to the sound sensor. The device also includes a control system configured to cause the sound generator to generate the sound and to use the sound detected by the sound sensor to generate output that represents the density of the insulation.

19 Claims, 5 Drawing Sheets

(56) References Cited

U.S. PATENT DOCUMENTS

2005/0268695 A1* 12/2005 Babineau, Jr. ........... G01N 9/32
73/32 R
2006/0150715 A1* 7/2006 Tinianov ............ G01N 29/2462
73/32 A

* cited by examiner

DEVICES AND METHODS FOR DETERMINING THE DENSITY OF INSULATION

CROSS-REFERENCE TO RELATED APPLICATIONS

This application is a U.S. National Stage application of International Patent Application no. PCT/US2019/038521, filed Jun. 21, 2019, which claims the benefit of priority of U.S. Provisional Patent Application No. 62/688,242, filed Jun. 21, 2018, which is hereby incorporated herein by reference in its entirety.

BACKGROUND OF THE DISCLOSURE

1. Field of the Disclosure

The present disclosure relates generally to devices and methods for determining the density of insulation, for example, to determine the degree of fill of insulation within a cavity.

2. Technical Background

Insulation materials such as fiberglass batts, rolls, blankets, or blown-in insulation are typically used to reduce the rate of heat transfer between two areas separated by a boundary. For example, in an attic, insulation material can be applied to the interior surface of the roof deck to slow the transfer of heat through the roof deck, that is, from the exterior of the house to the attic or vice versa. In another application, insulation material is applied to exterior walls (e.g., between wood studs) and covered with wallboards to slow the rate of heat transfer through the exterior wall and the wallboard. Insulation material can also prevent undesirable air movement (e.g., convection drafts) and resultant movement of moisture from one space to another.

In some instances, it is useful to determine the degree of fill (e.g., density) of insulation material within a cavity. For example, in a retrofit application, a technician might determine the degree of fill of insulation within an existing cavity to determine what changes, if any, need to be made to make the insulation conform to a degree of fill required by an updated building code. In another example, the technician uses a blower to blow loose insulation material into a cavity. In this case, the technician might keep track of the quantity (e.g., weight or volume) of the insulation blown into the cavity and compare that to the volume of the cavity to determine the density of the blown-in insulation. This technique relies on the assumption that the insulation blown into the cavity has a uniform density, which might not be the case.

There are other ways of measuring the fill of a cavity with loose insulation, including the method of the Cubic Foot Density Test (Blow-In-Blanket © Contractors Association—2008) and the Densi-Checker™ offered by Johns Manville for their Jet Spray insulation. However, these methods are destructive in nature, requiring that the area of test be repaired after sampling. It also is less practical to test multiple locations, because of the time involved and the multiple repairs that are required. Off-site testing may be performed as described in "Standard Practice for Determination of Thermal Resistance of Loose-Fill Building Insulation in Side Wall Applications" by ASTM Task Group for Sidewall R-value Loose Fill (ATS-4). This technique suffers from the time required for testing, and that the results from the sample may not necessarily be representative of the product as installed in the field.

Accordingly, what are needed are improved methods and devices for determining the density and/or degree of fill of insulation.

SUMMARY OF THE DISCLOSURE

One aspect of the disclosure is a device for determining the density of insulation, the device including:
  a first unit comprising a sound generator;
  a second unit comprising:
  a sound sensor; and
  a probe that is configured to be inserted into insulation such that the sound sensor is outside of the insulation and is configured to detect sound that is generated by the sound generator outside of the insulation and transmitted through the insulation and the probe to the sound sensor; and
  a control system configured to:
  cause the sound generator to generate the sound; and
  use the sound detected by the sound sensor to generate output that represents the density of the insulation.

Another aspect of the disclosure is a method for using the device of any of claims 1-20 for determining the density of insulation, the method including:
  positioning the first unit against the insulation such that the sound generator is outside of the insulation;
  inserting the probe into the insulation such that the sound sensor is outside of the insulation;
  causing, via the control system, the sound generator to generate sound that travels through the insulation from outside of the insulation;
  detecting, via the sound sensor, the sound that is generated by the sound generator and travels through the inserted probe to the sound sensor; and
  using, via the control system, the detected sound to generate output that represents the density of the insulation.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
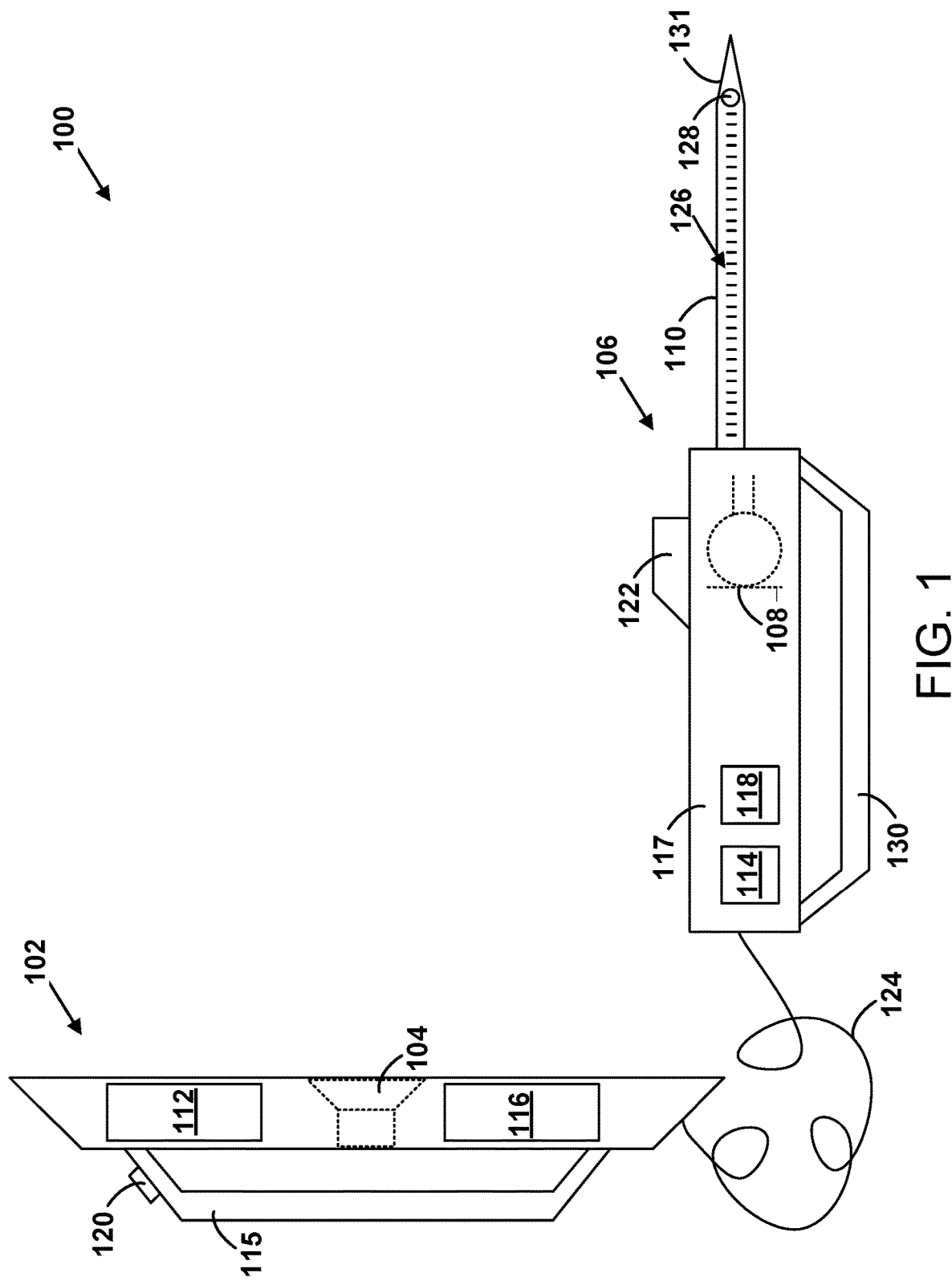
FIG. 1 is a side view of a device for determining the density of insulation, according to one embodiment of the disclosure.

As noted above, the present inventors have noted disadvantages of existing processes for determining the density of insulation, for example, to determine the degree of fill in an open or closed cavity.

Accordingly, one aspect of the disclosure is a device that includes a first unit that includes a sound generator (e.g., a speaker) and a second unit that includes a sound sensor (e.g., a microphone) and a probe (e.g., a hollow needle-like structure). The probe is configured to be inserted (e.g., through a paper barrier, a fabric barrier, or a netting that defines a cavity) into insulation such that the sound sensor is outside of the insulation and is configured to detect sound that is generated by the sound generator outside of the insulation and transmitted through the insulation and the probe to the sound sensor. The device also includes a control system (e.g., one or more processors and/or electronic hardware) configured to cause the sound generator to generate the sound and to use the sound detected by the sound sensor to generate output that represents the density of the insulation. The first unit and the second unit can be communicatively coupled via a wired connection or a wireless connection.

Another aspect of the disclosure is a method for determining the density of insulation. The method includes positioning the first unit against the insulation (e.g., against a barrier defining a cavity that contains the insulation) such that the sound generator is outside of the insulation. The method also includes inserting the probe into the insulation (e.g., through the barrier and into the cavity) such that the sound sensor is outside of the insulation. The method also includes causing, via the control system, the sound generator to generate sound that travels through the insulation from outside of the insulation. The method also includes detecting, via the sound sensor, the sound that is generated by the sound generator and travels through the inserted probe to the sound sensor. The method also includes using, via the control system, the detected sound to generate output that represents the density of the insulation. During operation, the sound generator and the sound sensor could be separated by a lateral distance ranging from 4 inches to 12 inches, but other examples are possible. In some situations, the device could be used to determine insulation density within large cavities such as a cavity between attic rafters. That is, the first unit (e.g., the sound generator) could be placed at one end of a rafter space and the probe could be inserted into insulation at an opposing end of the rafter space. Or, the device could be used to determine insulation density within a cavity that spans from a floor to a roof deck. That is, the first unit (e.g., the sound generator) could be placed against insulation near a ceiling and the probe could be inserted into insulation near the floor. As such, in various examples the sound generator and the sound sensor could be separated by 30 feet or less, e.g., by 26 feet, 20 feet, 15 feet, 12 feet, 10 feet, 9 feet, or 8 feet.

In certain embodiments, the control system is configured to determine the amplitude of the detected sound and/or determine a degree to which the detected sound is attenuated as the sound travels from the sound generator and through the insulation and the probe to be detected by the sound sensor. The control system can then use the determined amplitude or the determined degree of attenuation to infer a density of the insulation, for example, based on known material properties of the insulation, the known lateral spacing between the sound generator and the sound sensor, and/or the known depth of the cavity. As the person of ordinary skill in the art will appreciate, an increase in insulation density between two points is related to an increase in attenuation of sound that travels between the two points. In certain embodiments, multiple measurements can be taken with the sound sensor being at varying lateral distances from the sound generator, so as to normalize systemic losses. In other embodiments, the control system can determine the density of the insulation by comparing the determined amplitude or determined degree of attenuation with amplitudes or degrees of attenuation measured in air (e.g., without insulation between the sound generator and the sound sensor).

In particular embodiments, an exterior surface of the probe includes markings that are spaced periodically along a length of the probe, such that a technician can easily determine how deep the probe has been inserted into the insulation. The technician could insert the probe such that 0.5 inches to 5.5 inches of the probe is within the insulation, for example. In some examples, the depth of insertion will be limited by the length of the probe, but in other examples the depth of insertion will be limited by the depth of the cavity. The probe may also include a hole (e.g., near a distal end of the probe) configured to receive and/or collect the sound that is generated by the sound generator.

When compared to other devices and methods for determining the density of insulation, the disclosed devices and methods can be advantaged in that, in certain embodiments, they can be used to determine density without assuming that a known quantity of insulation has been blown into a cavity or another area with a uniform density. The disclosed devices and methods can also, in certain embodiments, be used in the field with little or no repair time required after testing. Additionally, the disclosed devices and methods can be configured, for example, to perform measurements of the density of insulation over an area or a volume of insulation, to yield more complete information.

For example, a technician can position the first unit (e.g., the sound generator) at a first position against the insulation and position the second unit (e.g., the sound sensor) at a second position against the insulation to perform a first measurement. The technician can then move the first unit and/or the second unit to a different position to perform a density measurement that reflects conditions of a different section of the insulation. In this way, the technician can quickly perform a series of measurements that provide density information for a large region of insulation.

In certain embodiments, the sound generator is configured to generate sound having frequencies (or a single frequency) within the range of 1 kHz to 10 KHz, e.g., within the range of 1 kHz to 6 kHz, within the range of 2 kHz to 6 kHz, within the range of 4 kHz to 5.5 kHz, or within the range of 4.8 kHz to 5.2 kHz. The sound generator can be configured, for example, to generate sound having a duration within a range of 0.25 seconds to 3 seconds, for example. The sound generator can be configured to generate sound in the form of broadband noise, chirps, sweeps (e.g., a sine sweep), or single tone frequencies, for example. "Chirps" or "sweeps" can include any sound having a single frequency that varies (e.g., increases or decreases) during the duration of the sound.

The sound generator can take a variety of forms. For example, in certain embodiments, the sound generator is a speaker. In other embodiments, the sound generator is a rod or a plate that is caused to vibrate at a high frequency by a driver.

In some embodiments, the control system (e.g., a component of either the first unit or the second unit) is configured to generate output that represents the density of the insulation using known characteristics of the insulation. For example, the control system can receive input, from a user interface (e.g., a component of either the first unit or the second unit), representing the known characteristics of the insulation, and use the received input to generate output that represents the density of the insulation. In other embodiments, the control system can use a lookup table to relate measured values with an identified type of insulation to correlate the measured values to a density.

In particular embodiments, the control system is configured to (1) determine a first duration that elapses between sound being generated by the sound generator and the sound being detected by the sound sensor, (2) compare the first duration to a second reference duration that corresponds to a duration that elapses between sound being emitted by the sound generator in open air and being detected by the sound sensor after the sound passes through the air, and (3) use results of the comparison to generate the output. Measurements can be made, for example, as a phase delay.

As the person of ordinary skill in the art will appreciate, the methods and devices described herein can be especially useful when used with loose-fill insulation. Moreover, they can be used with insulation in a variety of configurations, e.g., in a closed cavity such as to determine fill level in a blow-in-blanket system, or in an open cavity such as disposed between joists on an attic floor.

Figure 3:
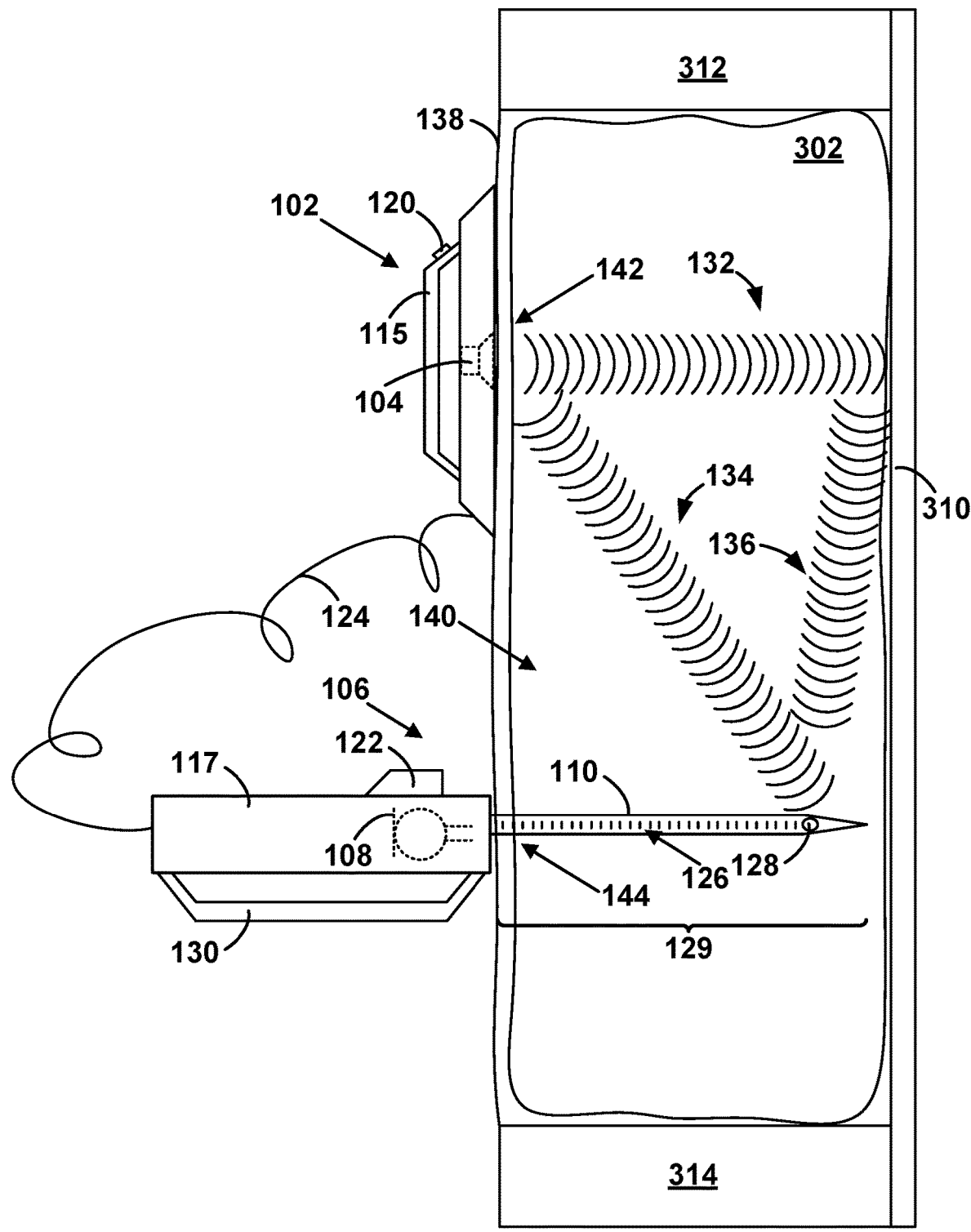
FIG. 3 depicts the use of a device for determining the density of insulation, according to one embodiment of the disclosure.
Figure 4:
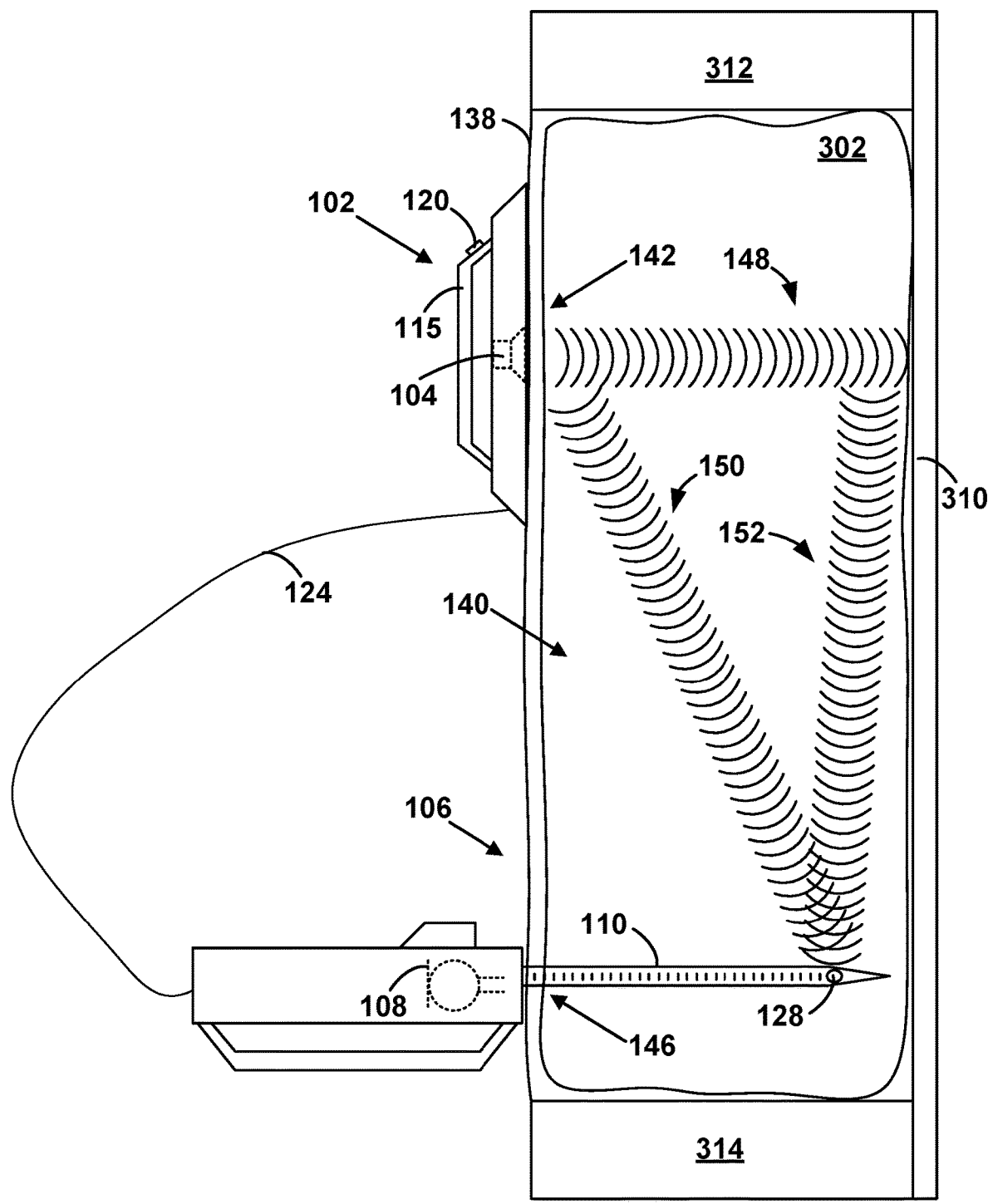
FIG. 4 depicts the use of a device for determining the density of insulation, according to one embodiment of the disclosure.
Figure 5:
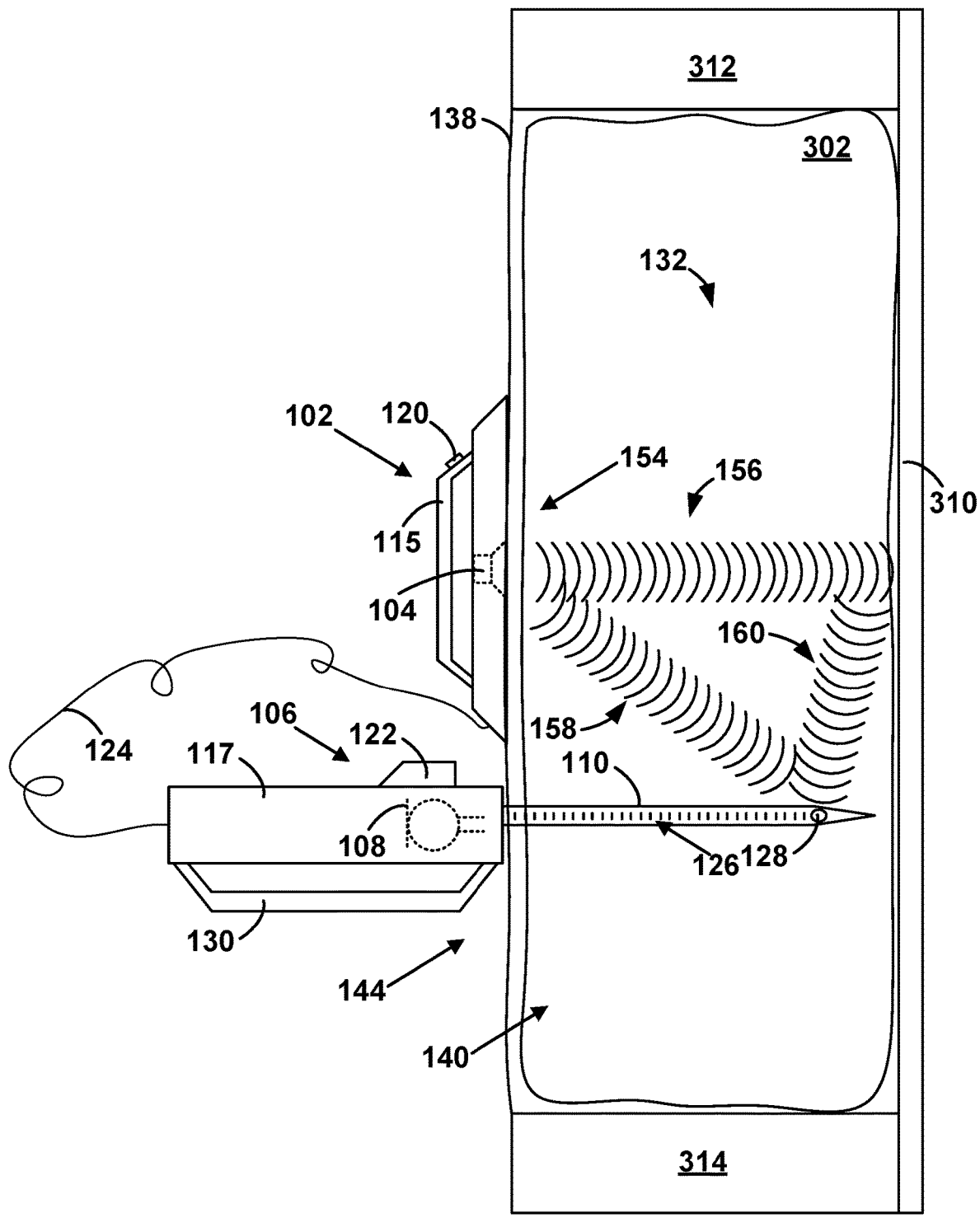
FIG. 5 depicts the use of a device for determining the density of insulation, according to one embodiment of the disclosure.

Referring now to the drawings, FIG. 1 is a side view of a device 100 for determining the density of insulation (e.g., in a cavity) (see FIGS. 3-5). The device 100 includes a first unit 102 that includes a sound generator 104 (e.g., a speaker). The device 100 also includes a second unit 106 that includes a sound sensor 108 (e.g., a microphone) and a probe 110. The probe 110 is configured to be inserted into insulation such that the sound sensor 108 is outside of the insulation and is configured to detect sound that is generated by the sound generator 104 outside of the insulation and transmitted through the insulation and the probe 110 to the sound sensor 108. The first unit 102 includes a control system 112 and the second unit 106 includes a control system 114. One or more of the control system 112 or the control system 114 is configured to cause the sound generator 104 to generate the sound and use the sound detected by the sound sensor 108 to generate output that represents the density of the insulation.

The first unit 102 includes a handle 115 and an actuator 120 (e.g., a trigger or a button). The first unit 102 and the second unit 106 are communicatively coupled by a wired connection 124 or a wireless connection. The second unit 106 includes a handle 130 and an actuator 122 (e.g., a trigger or a button).

In some examples, the sound generator 104 takes the form of a speaker (e.g., a woofer and/or a tweeter). The person of ordinary skill in the art will appreciate that other configurations are possible, e.g., a rod or plate that is configured to be vibrated at high frequency by a driver.

The sound generator 104 is configured to generate sound having frequencies within the range of 1 kHz to 10 KHz, e.g., within the range of 1 kHz to 6 kHz, within the range of 2 kHz to 6 kHz, within the range of 4 kHz to 5.5 kHz, or within the range of 4.8 kHz to 5.2 kHz, among other possible frequencies. The sound generator 104 is generally powered by the control system 112. In certain embodiments, the sound generator (or a plurality of sound generators) is operated at a plurality of frequencies, with measurements taken at each, to provide frequency-dependent data for use in correlating with insulation density.

The second unit 106 includes a housing 117 (e.g., a metal or plastic case) that contains the sound sensor 108. The sound sensor 108 may take the form of a microphone, but any devices configured to sense sound may be used (e.g., a piezoelectric sensor).

The probe 110 typically takes the form of a hollow metal or plastic needle-like structure that serves as a waveguide for collecting the sound that is generated by the sound generator 104 and travels through the insulation. The probe 110 is also configured to transmit the collected sound from a distal end 131 of the probe 110 to the sound sensor 108. The probe 110 includes a hole 128 configured to receive the sound that is generated by the sound generator 104. An exterior surface of the probe 110 includes markings 126 that are spaced periodically along a length of the probe. The markings 126 can be used to determine a depth to which the probe 110 (e.g., the distal end 131) has been inserted into insulation.

In some embodiments, the probe 110 has a retractable shield that can cover the distal end 131 or any length of the probe 110 when the device 100 is not in use. For example, a retractable shield might surround the probe 110, such that when the probe 110 is pushed through a barrier into insulation material, the retractable shield retracts (e.g., by being collapsed or by being pushed into the device) so that the probe 110 extends beyond the retractable shield into the insulation. In other examples, the probe 110 has a (e.g., plastic) cap that covers the distal end 131 when the device 100 is not in use.

The control system 112 and the control system 114 may be respectively implemented via any combination of hardware and/or software to implement the functionality described herein. For example, the control system 112 and the control system 114 can respectively include one or more processors (e.g., general purpose processors, digital signal processors, special purpose processors) and a memory (e.g., volatile, nonvolatile, removable, non-removable, magnetic, optical, or flash storage) storing instructions that, when executed by the one or more processors, cause the device 100 to perform any of the functions described herein. In another example, the control system 112 and the control system 114 respectively include special purpose hardware that is hard-wired to perform the functions described herein. Other examples are possible.

The control system 112 and/or the control system 114 are configured to generate output (e.g., visual or audio output) that represents the density of the insulation (e.g., using known characteristics of the insulation.) For example, the control system 112 and/or the control system 114 can be configured to receive input, from the user interface 116, the actuator 120, the actuator 122, or the user interface 118, representing the known characteristics of the insulation, and use the received input to generate output that represents the density of the insulation.

The user interface 116 and/or the user interface 118 can enable interaction between a user (if applicable) and the device 100. As such, the user interface 116 and/or the user interface 118 can respectively include input devices such as a keyboard, a keypad, a mouse, a touch-sensitive panel, a microphone, push buttons, and/or a camera. The user interface 116 and/or the user interface 118 can also respectively include output devices such as a display screen (which, for example, may be combined with a touch-sensitive panel), an audio speaker, a haptic feedback system, a voltmeter, an analog-to-digital converter, and/or an oscilloscope. The user interface 116 and/or the user interface 118 can be electrically coupled to and controlled by the control system 112 and/or the control system 114.

The device 100 can be powered electrically via a battery (not shown) or via standard 120 volt AC service. More generally, the device 100 can be powered by any electrical source that is known to one skilled in the art. One skilled in the art will appreciate that other power sources, such as USB ports, 9 or 12 volt car adapters, generators or solar panels can also be employed to bring power to or to recharge the batteries of the device at point of use or for preparation of use.

Electrical connections between the sound generator 104, the control system 112, the user interface 116, the actuator 120, the control system 114, the user interface 118, the actuator 122, and the sound sensor 108 are omitted from the drawings for the purpose of clarity.

Figure 2:
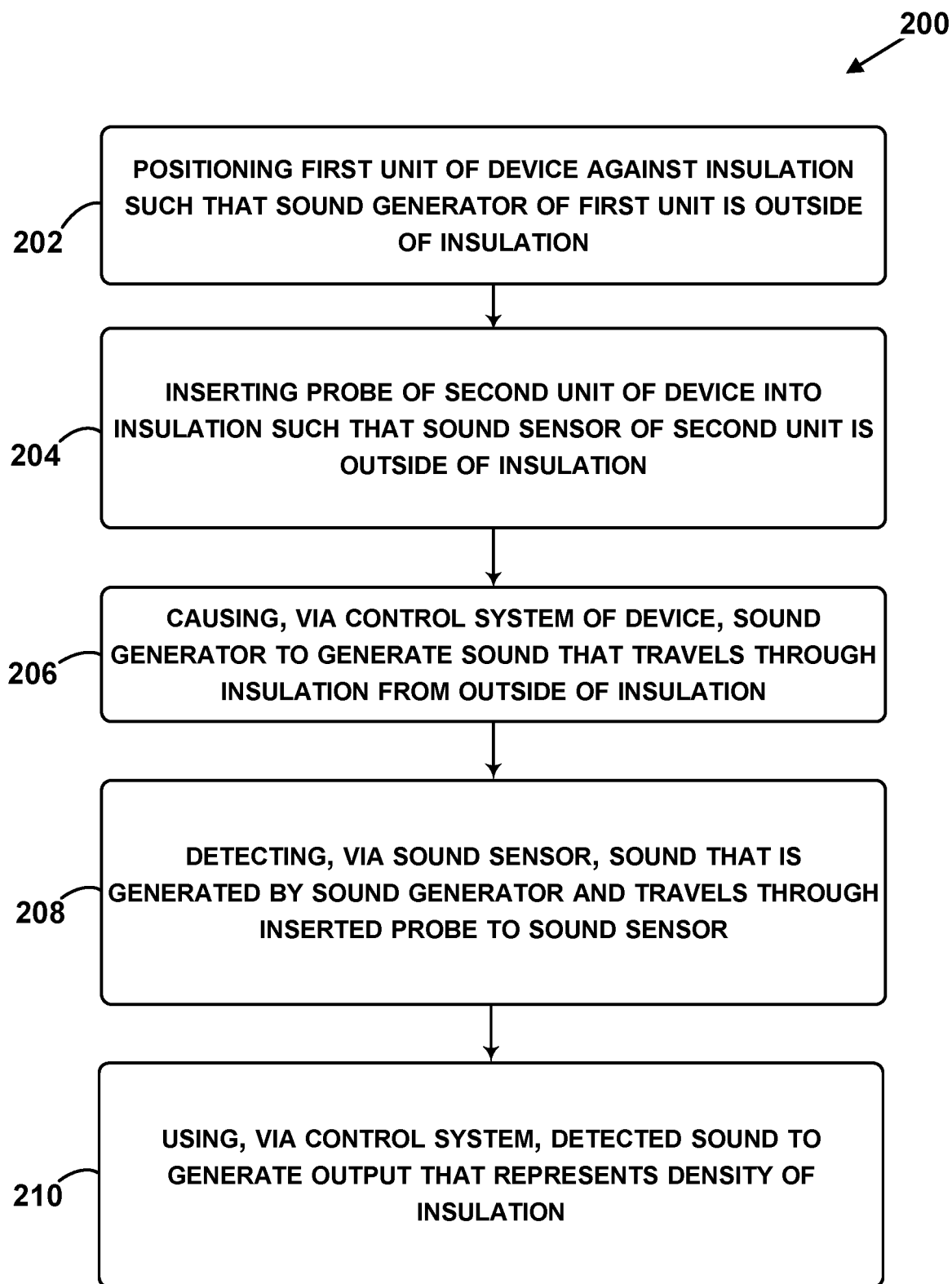
FIG. 2 is a block diagram of a method for determining the density of insulation, according to one embodiment of the disclosure.

FIG. 2 is a block diagram of a method 200 for determining the density of insulation (e.g., in a cavity) according to one embodiment of the disclosure. The method 200 can be performed using the device 100 to determine the density of insulation 302 in a cavity 140, as shown in FIGS. 3, 4, and 5. FIGS. 3, 4, and 5 are schematic cross-sectional views depicting the use of the device 100. The cavity 140 is partially defined by a structural member 310 (e.g., a plywood sheet), a structural member 312, (e.g., a wood stud), a structural member 314 (e.g., a wood stud), and a barrier 138 (e.g., a fabric netting, a sheet of paper, or a wallboard).

The cavity 400 may take the form of a space between wood studs of a wall. In this case, the insulation 402 may be exposed or may be concealed behind a wallboard or a vapor barrier (e.g., paper). In another example, the cavity 400 is concealed behind a netting that is attached to a roof deck, thereby defining the cavity 400. Other examples are possible. The insulation 402 may be composed of fiberglass or other fibrous material.

At block 202, the method 200 includes positioning a first unit of a device against insulation such that a sound generator of the first unit is outside of the insulation. For example, a technician can position the first unit 102 of the device 100 against the insulation 302 at a location 142 such that the sound generator 104 is outside of the insulation 302. More specifically, the technician can position the first unit 102 against the barrier 138 that retains the insulation 302 within the cavity 140.

In some embodiments, the first unit 102 includes one or more markings on a surface of the first unit 102 that indicate the location of the sound generator 104 within the first unit 102 so that the technician can accurately position the sound generator 104 during operation of the device 100.

At block 204, the method 200 includes inserting a probe of a second unit of the device into the insulation such that a sound sensor of the second unit is outside of the insulation. For example, a technician can insert the probe 110 of the second unit 106 of the device 100 into the insulation 302 (e.g., into the cavity 140) such that the sound sensor 108 of the second unit 106 is outside of the insulation 302. When the barrier 138 is present, block 204 might include inserting and/or pushing the probe through the barrier 138.

In various embodiments, the technician can insert the probe 110 into the insulation 302 such that a length 129 of 0.5 inches to 5.5 inches of the probe 110 is within the insulation 302 and/or within the cavity 140 behind the barrier 138. In particular embodiments, the technician can insert the probe 110 such that the length 129 is within a range of 1.5 inches to 4.5 inches, or within a range of 2.5 inches to 3.5 inches. Other insertion depths are possible.

As shown in FIG. 3, the probe 110 may be inserted at a location 144. In this context, the location 142 and the location 144 can be separated by a lateral distance (e.g., substantially parallel to the barrier 138) within a range of 4 inches to 12 inches. Other distances are possible.

At block 206, the method 200 includes causing, via a control system of the device, the sound generator to generate sound that travels through the insulation from outside of the insulation. For example, the control system 112 and/or the control system 114 can cause the sound generator 104 to generate sound 132 that travels through the insulation 302 from outside of the insulation 302 (e.g., from the position 142). FIG. 3 shows the sound 132 travelling perpendicular to the barrier 138 and the structural member 310. But, the sound generator 104 typically generates sound somewhat omnidirectionally, as exhibited by the sound 134 that travels in a direct line between the sound generator 104 and the hole 128 of the probe 110. As such, the sound generator 104 can generate sound that travels in directions that are not explicitly shown in FIGS. 3-5.

In some embodiments, the sound 132 and/or the sound 134 has a frequency (e.g., a single frequency or multiple frequencies) within the range of 1 kHz to 10 KHz, e.g., within the range of 1 kHz to 6 kHz, within the range of 2 kHz to 6 kHz, within the range of 4 kHz to 5.5 kHz, or within the range of 4.8 kHz to 5.2 kHz. Typically, the sound generator 104 will generate the sound 132 and/or the sound 134 to have a duration within the range of 0.25 seconds to 3 seconds, but other examples are possible.

In particular embodiments, the sound generator 104 can generate the sound 132 and/or the sound 134 in response to receiving input from the actuator 120 of the first unit 102. The sound 132 and/or the sound 134 might have a duration that lasts as long as input is provided at the actuator 120, or can have a predetermined duration that is independent of the duration of the input received at the actuator 120. The sound 132 could also be generated by the sound generator 104 in response to input received from the user interface 116 or the user interface 118. That is, the control system 112 or the control system 114 can receive such input and responsively provide a control signal to the sound generator 104 to cause the sound generator 104 to generate sound.

At block 208, the method 200 includes detecting, via the sound sensor, the sound that is generated by the sound generator and travels through the inserted probe to the sound sensor. For example, the sound 134 can travel directly from the sound generator 104 toward the hole 128. The sound 134 can then propagate along the (e.g., hollow) probe 110 from the hole 128 to the sound detector 108 to be detected by the sound detector 108. Additionally, the sound 136 representing a reflection of the sound 132 can travel toward the hole 128 from the structural member 310 and propagate along the probe 110 from the hole 128 to the sound detector 108 to be detected by the sound detector 108. Sound collected by the probe 110 can originate from other locations within the cavity and/or represent reflections (e.g., echoes) from other structural members or surfaces within the cavity 140 as well.

At block 210, the method 200 includes using, via the control system, the detected sound to generate output that represents the density of the insulation. Before generating the output, the control system 112 or the control system 114 can receive signals from the sound sensor 108 representing the sound detected by the sound sensor 108 (e.g., sound generated by the sound generator 104). The control system 112 and/or the control system 114 then generally process the received signals to generate the output that represents the density of the insulation 302 in the cavity 140. For example, the control system 112 and/or the control system 114 can use multiple signals to calculate an average density of the insulation 302 over an area or volume.

Once data is obtained in the form of a determined density of the insulation 302 (e.g., g/cm³), the data can be displayed in numeric form on a display screen of the user interface 116 or the user interface 118. Alternatively, a signal can be provided directly in the form of output to possible output devices of the user interface 116 or the user interface 118 such as an oscilloscope, a voltmeter, or an analog-to-digital converter.

It will be appreciated by one of skill in the art that a variety of devices can receive the output, and that the output could also be transmitted by non-direct means, such as to a smart phone, a computer, or a tablet device by wireless means. Such means could include Bluetooth, WiFi, or radio frequency transmission to devices capable of receiving such signals.

The ability of such signals to be analyzed by devices that prospective users might already own (such as a cell phone, smart phone, tablet, or computer) could mean that the cost of a measurement device could be considerably less expensive than if the output device was integrated into the measurement device directly. Likewise, providing the display or data analysis in an external device can reduce the weight and size of the measurement device, improving its usability and durability in the field.

In particular embodiments, the second unit 106 can generate a signal representing the sound detected by the sound sensor 108 in response to the second unit 106 receiving input from the actuator 122 of the second unit 106. For example, the control system 114 can generate a signal representing sound that is detected by the sound sensor 108 while the actuator 122 continues to be pressed by a user.

In some embodiments, using the detected sound to generate the output includes (1) determining a first duration that elapses between the sound being generated by the sound generator and the sound being detected by the sound sensor, (2) comparing the first duration to a second reference duration that corresponds to a duration that elapses between sound being emitted by the sound generator in open air and being detected by the sound sensor after the sound passes through the air; and (3) using results of the comparison to generate the output. In this context, the second reference duration generally corresponds to a situation in which the first unit and the second unit have relative positions that are similar to that of the control conditions in open air.

For instance, the control system 112 and/or the control system 114 can determine a first duration that elapses between the sound 132 being generated by the sound generator 104 and the sound 134 or the sound 136 being detected by the sound sensor 108. Next, the control system 112 and/or the control system 114 can compare the first duration to a second reference duration that corresponds to a duration that elapses between sound being emitted by the sound generator 104 in open air and being detected by the sound sensor 108 after the sound passes through the air. The control system 112 and/or the control system 114 can also use results of the comparison to generate the output.

In various examples, the control system 112 and/or the control system 114 might compare respective amplitudes of the sounds 134 or 136 detected by the sound sensor 108 to one or more known amplitudes of the sound 132 generated by the sound generator 104. In another example, the control system 112 and/or the control system 114 might compare respective amplitudes of one or more of the sounds detected by the sound sensor 108 to one or more reference amplitudes of sound that would be expected for detection if the device 100 was not inserted into the insulation 302. In yet another example, the control system 112 and/or the control system 114 might determine a duration of time that passes between sound being generated by the sound generator 104 and detection, and compare that duration to a duration that would be expected if the device 100 was not inserted into the insulation 302.

One way the control system 112 and/or the control system 114 can determine the density of the insulation is by using a mathematical function that maps (a) time delay and/or signal attenuation of the sound moving through the insulation (e.g., insertion loss) to (b) density of the insulation. The function may be determined experimentally via regression analysis, for example. In other examples, the control system 112 and/or the control system 114 may use a look up table that includes experimental data. Increased time delay between sound generation and sound detection generally correlates positively with higher insulation density. Higher sound attenuation (e.g., insertion loss) generally correlates positively with higher insulation density as well.

The control system 112 and/or the control system 114 can cause the respective user interfaces 116 and 118 to generate output. The output can take the form of displayed output and/or audio output, for example. The output might represent the density of the insulation 302 as an "R-value," a mass density, or as an attenuation metric (e.g., an insertion loss) that characterizes how much one or more of the sounds 134 or 136 are attenuated from a known intensity (e.g., amplitude) level after they travel to the sound sensor 108.

As such, in certain embodiments, using the detected sound to generate the output can include the control system 112 and/or the control system 114 determining a degree of attenuation of the detected sound 134 or the sound 136 as it travels from the sound generator 104 through the insulation 302 and through the probe 110 to the sound sensor 108. Additionally, the control system 112 and/or the control system 114 can use the determined degree of attenuation to generate the output.

In particular embodiments, the control system 112 and/or the control system 114 can use known characteristics of the insulation 302 (e.g., material composition) to generate the output. For example, the user interface 116 or the user interface 118 can receive input representing the known characteristics of the insulation and provide the input to the control system 112 or the control system 114. The control system 112 and/or the control system 114 can then use the received input to generate the output (e.g., use the known characteristics of the insulation to calculate an output).

As shown in FIG. 4, a technician can reinsert the probe 110 at a new location 146 such that the sound sensor 108 is outside (e.g., remains outside) of the insulation 302. Next, the control system 112 and/or the control system 114 can cause the sound generator 104 to generate additional sounds 148 and/or 150 that travel through the insulation 302 from the position 142 outside of the insulation 302. The sound sensor 108 can then detect, while the probe 110 is inserted at the new location 146, the additional sounds 150 or 152 that are generated by the sound generator 104 and travel through the inserted probe 110 to the sound sensor 108. Accordingly, the control system 112 and/or the control system 114 can use the sounds 150 or 152 to generate another output that represents the density of the insulation 302.

As shown in FIG. 5, a technician can reposition the first unit 102 at a new location 154 such that the sound generator 104 is outside (e.g., remains outside) of the insulation 302. Next, the control system 112 and/or the control system 114 can cause the sound generator 104 to generate additional sounds 156 and/or 158 that travel through the insulation 302 from the position 154 outside of the insulation 302. The sound sensor 108 can then detect, while the probe 110 is inserted at the location 144, the additional sounds 158 or 160 that are generated by the sound generator 104 and travel through the inserted probe 110 to the sound sensor 108. Accordingly, the control system 112 and/or the control system 114 can use the sounds 158 or 160 to generate another output that represents the density of the insulation 302.

As such, the control system 112 and/or the control system 114 is able to collect data representing density conditions along multiple paths and possibly different depths within the insulation 302. If the control system 112 and/or the control system 114 collects enough data, the control system 112 and/or the control system 114 can generate output reliably representing the density of the insulation 302 over a volume.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A method for determining the density of insulation, the method comprising:
   providing a device comprising:
      a first unit comprising a sound generator;
      a second unit comprising:
         a sound sensor; and
         a probe that is configured to be inserted into insulation such that the sound sensor is outside of the insulation and is configured to detect sound that is generated by the sound generator outside of the insulation and transmitted through the insulation and the probe to the sound sensor; and
      a control system configured to:
         cause the sound generator to generate the sound, the sound having a duration within the range of 0.25 seconds to 3 seconds; and
         use the sound detected by the sound sensor to generate output that represents the density of the insulation;
   positioning the first unit against the insulation such that the sound generator is outside of the insulation;
   inserting the probe into the insulation such that the sound sensor is outside of the insulation;
   causing, via the control system, the sound generator to generate sound that travels through the insulation from outside of the insulation;
   detecting, via the sound sensor, the sound that is generated by the sound generator and travels through the inserted probe to the sound sensor; and
   using, via the control system, the detected sound to generate output that represents the density of the insulation.

2. The method of claim 1, wherein positioning the first unit against the insulation comprises positioning the first unit against a barrier that retains the insulation within a cavity.

3. The method of claim 2, wherein inserting the probe into the insulation comprises inserting the probe into the cavity.

4. The method of claim 1, wherein causing the sound generator to generate the sound comprises causing the sound generator to generate sound having a frequency within the range of 1 kHz to 10 KHz.

5. The method of claim 1, wherein detecting the sound comprises detecting sound that travels directly from the sound generator to the probe.

6. The method of claim 1, wherein detecting the sound comprises detecting sound that reflects from one or more surfaces of the cavity.

7. The method of claim 1, wherein using the detected sound to generate the output comprises:
   determining a degree of attenuation of the detected sound as it travels from the sound generator through the insulation and through the probe to the sound sensor; and
   using the determined degree of attenuation to generate the output.

8. The method of claim 1, wherein using the detected sound to generate the output comprises generating the output using known characteristics of the insulation.

9. The method of claim 8, further comprising:
   receiving input, from a user interface, representing the known characteristics of the insulation; and
   using the received input to generate the output.

10. The method of claim 1, wherein positioning the first unit against the insulation comprises positioning the first unit at a first location, and wherein inserting the probe comprises inserting the probe at a second location, the method further comprising:
    reinserting the probe at a third location such that the sound sensor is outside of the insulation;
    causing, via the control system, the sound generator to generate an additional sound that travels through the insulation from outside of the insulation while the first unit is in the first location;
    detecting, via the sound sensor while the probe is inserted at the third location, the additional sound that is generated by the sound generator and travels through the inserted probe to the sound sensor; and
    using, via the control system, the detected additional sound to generate another output that represents the density of the insulation.

11. The method of claim 1, wherein positioning the first unit against the insulation comprises positioning the first unit at a first location, and wherein inserting the probe comprises inserting the probe at a second location, the method further comprising:
    repositioning the first unit at a fourth location such that the sound generator is outside of the insulation;
    causing, via the control system, the sound generator to generate an additional sound that travels through the insulation from outside of the insulation while the first unit is in the fourth location;
    detecting, via the sound sensor while the probe is inserted at the second location, the additional sound that is generated by the sound generator and travels through the inserted probe to the sound sensor; and
    using, via the control system, the detected additional sound to generate another output that represents the density of the insulation.

12. The method of claim 1, wherein using the detected sound to generate the output comprises:
    determining a first duration that elapses between the sound being generated by the sound generator and the sound being detected by the sound sensor;
    comparing the first duration to a second reference duration that corresponds to a duration that elapses between sound being emitted by the sound generator in open air and being detected by the sound sensor after the sound passes through the air; and
    using results of the comparison to generate the output.

13. The method of claim 1, wherein positioning the first unit against the insulation comprises positioning the first unit at a first location, wherein inserting the probe comprises inserting the probe at a second location, and wherein the first location and the second location are separated by a lateral distance within a range of 4 inches to 12 inches.

14. The method of claim 1, wherein using the detected sound to generate the output comprises:
determining a first duration that elapses between the sound being generated by the sound generator and the sound being detected by the sound sensor;
comparing the first duration to a second reference duration that corresponds to a duration that elapses between sound being emitted by the sound generator in open air and being detected by the sound sensor after the sound passes through the air; and
using results of the comparison to generate the output.

15. A method for determining the density of insulation, the method comprising:
providing a device comprising:
a first unit comprising a sound generator;
a second unit comprising:
a sound sensor; and
a probe that is configured to be inserted into insulation such that the sound sensor is outside of the insulation and is configured to detect sound that is generated by the sound generator outside of the insulation and transmitted through the insulation and the probe to the sound sensor; and
a control system configured to:
cause the sound generator to generate the sound; and
use the sound detected by the sound sensor to generate output that represents the density of the insulation;
positioning the first unit against the insulation such that the sound generator is outside of the insulation;
inserting the probe into the insulation such that the sound sensor is outside of the insulation, wherein inserting the probe into the insulation comprises inserting the probe such that 0.5 inches to 5.5 inches of the probe is within the insulation;
causing, via the control system, the sound generator to generate sound that travels through the insulation from outside of the insulation;
detecting, via the sound sensor, the sound that is generated by the sound generator and travels through the inserted probe to the sound sensor; and
using, via the control system, the detected sound to generate output that represents the density of the insulation.

16. A device for determining the density of insulation, the device comprising:
a first unit comprising a sound generator;
a second unit comprising:
a sound sensor; and
a probe that is configured to be inserted into insulation such that the sound sensor is outside of the insulation and is configured to detect sound that is generated by the sound generator outside of the insulation and transmitted through the insulation and the probe to the sound sensor; and
a control system configured to:
cause the sound generator to generate the sound, the sound having a duration in the range of 0.25 seconds to 3 seconds; and
use the sound detected by the sound sensor to generate output that represents the density of the insulation.

17. The device of claim 16, wherein the sound generator is configured to generate sound having frequencies within the range of 1 kHz to 10 kHz.

18. The device of claim 16, wherein the probe is configured to be inserted into a cavity containing the insulation.

19. The device of claim 16, wherein the control system is configured to generate output that represents the density of the insulation using known characteristics of the insulation.

* * * * *